Figure 2A:
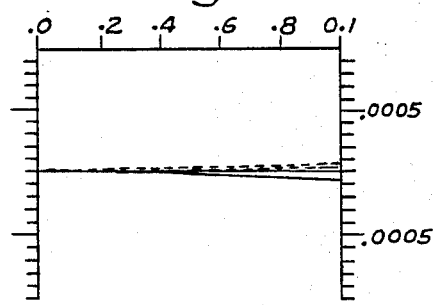

United States

Fleischman

[11] 3,998,528

[45] Dec. 21, 1976

[54] 7MM ULTRAFICHE LENS

[75] Inventor: Andor A. Fleischman, Northbrook, Ill.

[73] Assignee: Bell & Howell Company, Chicago, Ill.

[22] Filed: Sept. 29, 1975

[21] Appl. No.: 617,773

[52] U.S. Cl. .................................. 350/176; 350/214
[51] Int. Cl.² .......................................... G02B 9/64
[58] Field of Search ............................ 350/214, 176

[56] References Cited

UNITED STATES PATENTS 3,759,606   9/1973   Van Orden .................. 350/214

Primary Examiner—John K. Corbin
Assistant Examiner—Conrad Clark
Attorney, Agent, or Firm—John E. Peele, Jr.

[57] ABSTRACT

This invention relates to a short focal length, large aperture, high resolution optical system for efficiently transmitting a microfiche image to a viewing surface at an unusually high magnification ratio with an extraordinarily high degree of correction over a prescribed field.

1 Claim, 9 Drawing Figures

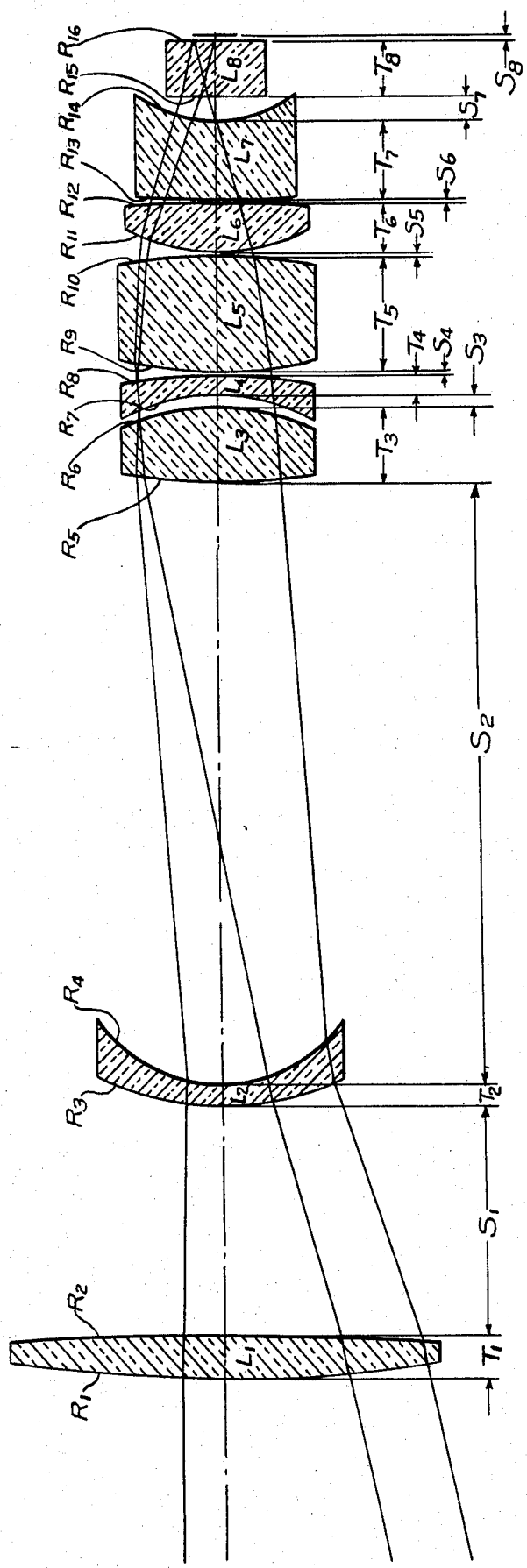

F/1.21

F/1.72

−0.010  +0.010

12.83°

9.19°

−0.010  +0.010

7MM ULTRAFICHE LENS

This invention relates to a short focal length, large aperture optical system for imaging an ultra-small microfiche image on a viewing surface. The optical system provides an unusually high magnification ratio at an extraordinarily high resolution and correction over a prescribed field.

Optical systems have been designed to efficiently project images of microfiche records records onto viewing surfaces, such as rear projection screens in microfiche viewers. Such viewers accept small cards on which many images of source materials are photographically recorded, which images must be enlarged to be readable. Generally, these microfiche images are enlarged 42 times from the film size to the screen size. Because many of the source materials are printed records, such as magazines or newspapers, high resolution and optical correction is required so that the image on the screen is readable by the user.

To enable storage of still more "pages" of information on a single fiche card of a predetermined size, a smaller format image is provided, hereinafter referred to as "ultra fiche". This format requires enlargement of approximately 170 times to reach readable size. Thus, an optical system for enlarging the ultrafiche images requires extremely good resolution and correction to enable the very small image to be enlarged to readable condition. Since the ultrafiche images may be recorded in full color, the optical system must be highly corrected across substantially the entire visible spectrum. Further, because the optical system is to be used in mass-produced ultrafiche viewers, the elements of the optical system should be capable of easy assembly, yet be as accurately positionable as required for the desired high degree of correction and resolution.

An object of the invention is to provide a short focal length, large aperture optical system providing a high magnification ratio at extraordinarily high resolution and correction over the prescribed field.

Other objects and advantages of the invention will become apparent from the detailed description which follows when taken in conjunction with the accompanying drawings in which:

FIG. 1 is a diagrammatic sectional view of a preferred optical system according to the present invention; and FIG. 2a to 2h are graphical representations of the various aberrations of the lens system shown in FIG. 1 and having the design date given in Table 1.

Referring to the drawings, an optical system is shown for enlarging an ultrafiche image onto a viewing surface, such as the rear screen of a fiche viewer. In the embodiment shown, the enlargement or magnification ratio is 170 times whereby the image format of 0.125 inches (3.175mm) diagonal is enlarged to approximately 21.2 inches (538.48mm). This 7 element lens is highly corrected across the visible spectrum to provide resolution in excess of 700 lines per millimeter. The optical system is designed to a 7mm focal length with an effective aperture of f/1.2 unusually large for the extremely short focal length. The arrangement of elements, as hereinafter described, provides for critically imaging the images at 47.7 inches object to film plane distance.

The all-glass optical system of FIG. 1 includes a first element $L_1$, starting from the ray exit side of the system, of a relatively large diameter, and of positive power.

Element $L_2$, a meniscus element of negative power, is axially separated and air spaced from element $L_4$. This second element is arranged to receive rays from an air spaced element $L_3$. Elements $L_4$, $L_5$, $L_6$ and $L_7$ are closely spaced for receiving light rays from an image substantially flush with the outer surface of the cover glass $L_8$. The elements $L_4$ through $L_7$ are respectively of negative, positive, positive and negative power. The cover glass $L_8$ is planar optical material arranged in the back focus area of the optical system. The cover glass is provided to guarantee the flatness of the film to be projected. The combination of optical elements provides an optical system having the desired characteristics, which system projects the image onto a remote viewing surface.

The optical system is a 7mm (0.276 inch) focal length objective having an effective aperture of f/1.2. The system has a half angle of field of 12.88°, and is essentially diffraction limited over this prescribed field.

Figure 2B:
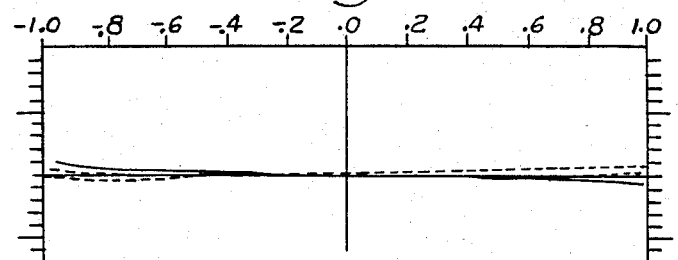
Figure 2C:
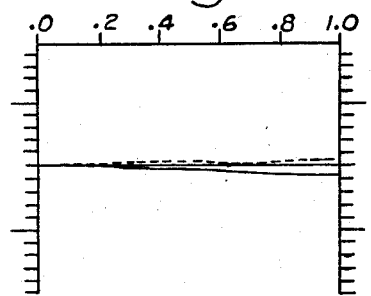
Figure 2D:
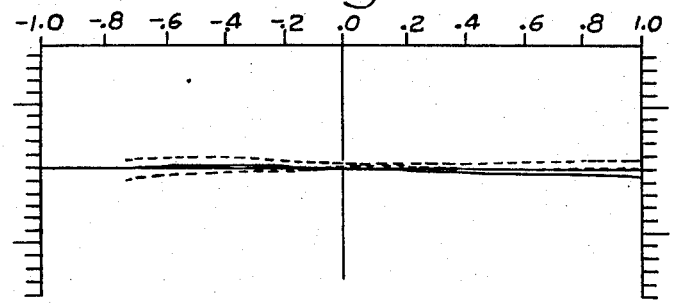
Figure 2E:
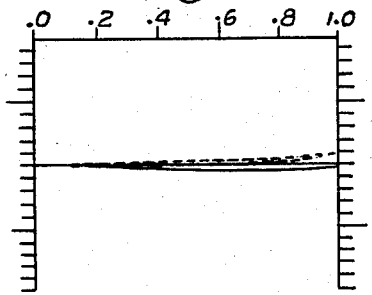
Figure 2F:
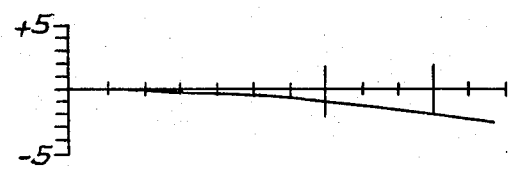
Figure 2G:
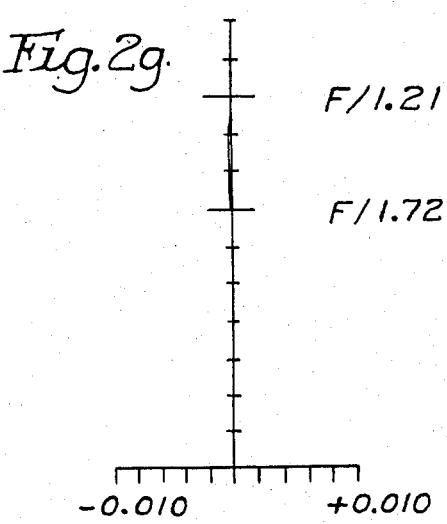
Figure 2H:
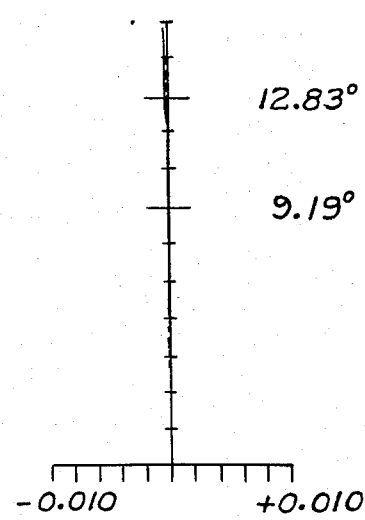

As seen in FIGS. 2a to 2h, which diagrammaticaly represent the aberrations of the FIG. 1 optical system, a combined extraordinarily high degree of correction and resolution is obtained in an extremely short focal length optical system of large effective aperture. FIGS. 2a to 2h graphically represent various aberrations of this form of the optical system, as shown in FIG. 1 and having the design data recited in Table 1. FIG. 2a represents aberrations of three primary wavelengths of the spectrum at 5896, 6563, and 4861 Angstroms of the rays on axis. FIG. 2b represents off axis aberrations of a rays passing from the zone of the film format and through the lens transversely and tangentially. FIG. 2c represents the aberrations of the rays passing from the corner of the film format through the lens tangentially and transversely. FIG. 2d represents the radial or longitudinal aberrations from the zone of the film format of rays entering the lens at 3 o'clock, while FIG. 2e represents similar aberrations from full field or corner rays. FIG. 2f represents distortion as a percentage of a "perfect" image. FIG. 2g represents the spherical aberrations by a full line and the offense-against-sine-condition by the dotted line. FIG. 2h represents the curvature of field with tangential curvature being shown in full line and sagittal curvature being shown in dashed line.

The optical values of the optical system of FIG. 1 are as follows:

TABLE 1

| Lens | Radii (In.) | Thickness | Spacing | V | $N_D$ |
|---|---|---|---|---|---|
| $L_1$ | $R_1$=4.5520 | | | 25.7 | 1.785 |
| | $R_2$=11.8800 | $T_1$=.0900 | | | |
| | | | $S_1$=.5040 | | |
| $L_2$ | $R_3$=.7520 | | | 54.7 | 1.691 |
| | $R_4$=−.3510 | $T_2$=.0500 | | | |
| | | | $S_2$=1.3570 | | |
| $L_3$ | $R_5$=2.6748 | | | 51.7 | 1.734 |
| | $R_6$=.5280 | $T_3$=.1600 | | | |
| | | | $S_3$=.0279 | | |
| $L_4$ | $R_7$=−.4620 | | | 25.4 | 1.805 |
| | $R_8$=1.5590 | $T_4$=.0400 | | | |
| | | | $S_4$=.0050 | | |
| $L_5$ | $R_9$=.7135 | | | 51.7 | 1.734 |
| | $R_{10}$=1.4020 | $T_5$=.2710 | | | |
| | | | $S_5$=.0050 | | |
| $L_6$ | $R_{11}$=.3780 | | | 51.7 | 1.734 |
| | $R_{12}$=−3.3579 | $T_6$=.1000 | | | |
| | | | $S_6$=.0020 | | |

TABLE 1

EFL = .2719 in./6.91mm
½ Angle of Field = 12.88°

| Lens | Radii (In.) | Thickness | Spacing | V | $N_D$ |
|---|---|---|---|---|---|
| $L_1$ | $R_1$=4.5520<br>$R_2$=11.8800 | $T_1$=.0900 | | 25.7 | 1.785 |
| | | | $S_1$=.5040 | | |
| $L_2$ | $R_3$=.7520<br>$R_4$=−.3510 | $T_2$=.0500 | | 54.7 | 1.691 |
| | | | $S_2$=1.3570 | | |
| $L_3$ | $R_5$=2.6748<br>$R_6$=.5280 | $T_3$=.1600 | | 51.7 | 1.734 |
| | | | $S_3$=.0279 | | |
| $L_4$ | $R_7$=−.4620<br>$R_8$=1.5590 | $T_4$=.0400 | | 25.4 | 1.805 |
| | | | $S_4$=.0050 | | |
| $L_5$ | $R_9$=.7135<br>$R_{10}$=1.4020 | $T_5$=.2710 | | 51.7 | 1.734 |
| | | | $S_5$=.0050 | | |
| $L_6$ | $R_{11}$=.3780<br>$R_{12}$=−3.3579 | $T_6$=.1000 | | 51.7 | 1.734 |
| | | | $S_6$=.0020 | | |
| $L_7$ | $R_{13}$=7.7020<br>$R_{14}$=−.2900 | $T_7$=.1870 | | 25.4 | 1.805 |
| | | | $S_7$=.0540<br>(.1803=BFL) | | |
| $L_8$ | $R_{15}$=Inf<br>$R_{16}$=Inf | $T_8$=.1240 | | Optical<br>Material | |
| | | | O−$S_8$=.563 | | |

In the above table, the first column lists the lens elements numerically starting at the ray entrance side of the system. The second column lists the radii for the respective surfaces of the elements. The "t" values of the radii indicate surfaces which are convex and the "−" value of the radii indicate surfaces which are concave. The third column lists the thickness of the respective elements. The fourth column lists the axial spacings between the respective elements and the nominal image plane. The fifth and sixth columns list respectively the dispersive index V and the refractive index "$N_D$" of the optical glass from which the elements are manufactured.

What I claim is:

1. An optical system of short focal length and large aperture for magnifying an image at a high magnification ratio having substantially the following specification:

wherein the first column lists the lens elements starting at the ray exit side of the system; the second column lists the respective radii $R_1 - R_{10}$ for the surfaces of the elements; the third column lists the thickness $T_1$ to $T_8$ of the respective elements; the fourth column lists the axial spacings $S_1$ to $S_8$ between the respective elements and the image plane; and the fifth and sixth column list respectively the dispersive index V and the refractive index "$N_D$" of the elements.

* * * * *